United States Patent
He et al.

(10) Patent No.: US 12,461,702 B2
(45) Date of Patent: Nov. 4, 2025

(54) METHODS AND SYSTEMS FOR PROPAGATING USER INPUTS TO DIFFERENT DISPLAYS

(71) Applicant: HONEYWELL INTERNATIONAL INC., Charlotte, NC (US)

(72) Inventors: Gang He, Morristown, NJ (US); Thea Feyereisen, Hudson, WI (US); Rakshit R, Bangalore (IN); Zuowei He, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 110 days.

(21) Appl. No.: 17/210,303

(22) Filed: Mar. 23, 2021

(65) Prior Publication Data

US 2022/0244898 A1    Aug. 4, 2022

(30) Foreign Application Priority Data

Feb. 2, 2021    (IN) .............................. 202111004423

(51) Int. Cl.
| | |
|---|---|
| *G06F 3/048* | (2013.01) |
| *G01C 21/20* | (2006.01) |
| *G06F 3/04815* | (2022.01) |
| *G06F 3/04883* | (2022.01) |
| *G06F 3/14* | (2006.01) |
| *G06F 3/147* | (2006.01) |

(52) U.S. Cl.
CPC ............. *G06F 3/147* (2013.01); *G01C 21/20* (2013.01); *G06F 3/04815* (2013.01); *G06F 3/04883* (2013.01); *G06F 3/1454* (2013.01)

(58) Field of Classification Search
CPC .. G06F 3/147; G06F 3/04815; G06F 3/04883; G06F 3/1454; G01C 21/20; G01C 23/00; G09G 5/32; G09G 2340/0464; G09G 2380/12

See application file for complete search history.

(56) References Cited

U.S. PATENT DOCUMENTS

| | | |
|---|---|---|
| 8,519,997 B2 | 8/2013 | Suddreth et al. |
| 8,532,844 B2 | 9/2013 | Wilson et al. |
| 8,878,872 B1 | 11/2014 | Raghu et al. |
| 9,530,318 B1 | 12/2016 | Turner et al. |
| 9,718,558 B2 | 8/2017 | Ball et al. |

(Continued)

FOREIGN PATENT DOCUMENTS

| | | |
|---|---|---|
| DE | 102012213357 A1 | 1/2014 |
| EP | 3033592 A0 | 2/2015 |

(Continued)

*Primary Examiner* — Mohamed Abou El Seoud
(74) *Attorney, Agent, or Firm* — Ingrassia Fisher & Lorenz, LLP (57) ABSTRACT

Methods and systems are provided for propagating a free-form user input across different displays. One method involves receiving a free-form user input on a navigational map display, assigning a geographic location to the free-form user input based on a position of the free-form user input on the navigational map display, and generating a graphical indication influenced by the free-form user input on a second display at a respective position on the second display corresponding to the geographic location assigned to the free-form user input.

20 Claims, 5 Drawing Sheets

(56) References Cited

U.S. PATENT DOCUMENTS

| | | | |
|---|---|---|---|
| 2009/0319100 A1* | 12/2009 | Kale | G08G 5/0013 |
| | | | 701/4 |
| 2010/0198489 A1 | 8/2010 | Rozovski et al. | |
| 2012/0075123 A1 | 3/2012 | Keinrath et al. | |
| 2013/0096819 A1* | 4/2013 | Tarnok | G01C 21/3844 |
| | | | 701/538 |
| 2015/0260525 A1* | 9/2015 | Parthasarathy | G01C 21/20 |
| | | | 701/538 |
| 2015/0341400 A1* | 11/2015 | Vong | G06F 3/041 |
| | | | 715/753 |
| 2016/0103579 A1 | 4/2016 | Coulmeau et al. | |
| 2016/0171899 A1 | 6/2016 | Depare et al. | |
| 2018/0039401 A1 | 2/2018 | Freville | |
| 2019/0070959 A1* | 3/2019 | Hamasaki | G06F 13/00 |
| 2019/0195651 A1 | 6/2019 | Arnano et al. | |
| 2020/0184830 A1 | 6/2020 | Samuthirapandian et al. | |
| 2020/0394925 A1* | 12/2020 | Poulose | G02B 27/01 |

FOREIGN PATENT DOCUMENTS

| | | |
|---|---|---|
| EP | 3101392 A1 | 12/2016 |
| EP | 3388785 A1 | 10/2018 |

* cited by examiner

METHODS AND SYSTEMS FOR PROPAGATING USER INPUTS TO DIFFERENT DISPLAYS

CROSS REFERENCE TO RELATED APPLICATION

The present application claims benefit of prior filed Indian Provisional Patent Application No. 202111004423, filed Feb. 2, 2021, which is hereby incorporated by reference herein in its entirety.

TECHNICAL FIELD

The subject matter described herein relates generally to vehicle systems, and more particularly, embodiments of the subject matter relate to aircraft systems and related cockpit displays.

BACKGROUND

Modern electronic displays for vehicles (such as aircraft, automobiles, marine vessels, or trains) display a considerable amount of information, such as vehicle position, navigation and terrain information. In the case of an aircraft, many modern flight deck displays (or cockpit displays) are utilized to provide a number of different displays from which the user can obtain information or perform functions related to, for example, navigation, flight planning, guidance and navigation, and performance management. Modern displays may also incorporate notetaking functionality that allow a pilot to jot down information, such as, navigational clearances or commands issued by Air Traffic Control (ATC), personal reminders, observations or other experiential information, and/or the like. For example, due to the unpredictable nature of aviation, procedures, runways, taxiways, airspaces, and the like may be temporarily unavailable or otherwise restricted. This information is typically transmitted to flight crews via radio communications on an ad hoc basis, which, in turn, often entails the flight crew writing down or otherwise manually recording the information for future reference during planning and operations when the phase of flight and/or pilot tasks overlap or otherwise relate to the information. However, a pilot or crew member may still be relegated to mentally anticipating the potential avionics displays or systems where the information may be relevant in the future and manually propagating the information across those avionics displays or systems, which may be time consuming, inefficient, error prone, and potentially distracting. Accordingly, it is desirable to eliminate potentially redundant or tedious tasks while improving situational awareness with respect to unpredictable events that may impact vehicle operation on an ad hoc basis. Other desirable features and characteristics will become apparent from the subsequent detailed description and the appended claims, taken in conjunction with the accompanying drawings and this background.

BRIEF SUMMARY

Methods and systems are provided for propagating a free-form user input across different displays. An exemplary method involves receiving a free-form user input on a navigational map display, assigning a geographic location to the free-form user input based on a position of the free-form user input on the navigational map display, and generating a graphical indication corresponding to the free-form user input on a second display at a respective position on the second display corresponding to the geographic location assigned to the free-form user input.

In another embodiment, a system is provided that includes a display device having a navigational map display rendered thereon, a user input device to receive a free-form user input with respect to the navigational map display, and a processing system coupled to the display device and the user input device to assign a geographic location to the free-form user input based on a position of the free-form user input on the navigational map display and generate a graphical indication corresponding to the free-form user input on a second display at a respective position on the second display corresponding to the geographic location assigned to the free-form user input.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein generally relate to systems and methods that facilitate a pilot or other vehicle operator providing free-form graphical user input on a navigational map display and propagating the free-form graphical user input to other displays or onboard systems. In this regard, a free-form graphical user input is unconstrained and not limited to any particular location, field, area or graphical user interface (GUI) element on the display designated for receiving user input, nor is the free-form graphical user input limited to any particular size, shape, or other geometric characteristic. Although the subject matter is described herein primarily in an aviation context and potentially with reference to a flight plan, taxi route, or the like, it should be understood that the subject matter may be similarly utilized in other applications involving a predefined route for travel (e.g., a travel plan or travel route) or with another vehicle (e.g., automobiles, marine vessels, trains), and the subject matter described herein is not intended to be limited to use with aircraft or in an aviation environment.

As described in greater detail below, in one or more exemplary embodiments, a tactile free-form graphical user input on a touchscreen, touch-panel, or other tactile input device using a finger, stylus, pen, or the like is resolved to a particular coordinate location on the navigational map display, which, in turn, may be associated with a geographic location depicted at that coordinate location on the navigational map display. In this manner, a geographic location (e.g., a set of latitude and longitude coordinates) is assigned to the free-form user input and transmitted or otherwise provided to one or more other onboard systems for providing corresponding output(s) influenced by the free-form user input. It should be noted that the tactile free-form graphical user input may be accomplished, achieved or otherwise effectuated without requiring direct physical contact with a display surface, for example, via use of a proximity sensor, sensor glove (e.g., for a head-up or head-worn display), and/or the like.

For example, in some embodiments, a graphical indication influenced by the free-form user input may be generated or otherwise displayed on one or more other displays at respective positions on those displays that correspond to the geographic location assigned to the free-form user input. In this regard, when the free-form user input is provided on a lateral map or other two-dimensional navigational map display, the free-form user input may be associated with or otherwise assigned the geographic location(s) underlying the free-form user input, and indicia of the geographic location(s) assigned to the free-form user input may be transmitted or otherwise provided to another system for presentation on a three-dimensional display, such as a synthetic vision display, a heads-up display, a perspective view display, an orthographic view display, or the like, at a position corresponding to the assigned geographic location(s). Similarly, when the free-form user input is provided on a three-dimensional navigational map display, such as a synthetic vision display, indicia of the geographic location(s) assigned to the free-form user input may be transmitted or otherwise provided to another system for presentation on a lateral map or other two-dimensional display at the assigned geographic location(s). Thus, a free-form user input on a navigational map display may be automatically propagated across other relevant onboard displays and/or display systems without requiring duplicative efforts by the pilot or vehicle operator, thereby ensuring consistency of presentation of the free-form user input and facilitating situational awareness across the different displays.

In other embodiments, the geographic location assigned to the free-form user input may be utilized to dynamically update a flight plan, taxi route, or other planned route of travel in a manner that accounts for the location of the free-form user input, and display or otherwise provide graphical indicia of the updated route of travel that is influenced by the free-form user input. In this regard, depending on the shape or other spatial characteristics of the free-form user input, the planned route of travel may be automatically and dynamically updated to traverse or avoid the geographic location associated with the free-form user input without requiring the pilot or vehicle operator to manually interface with the corresponding onboard systems to manually input and initiate an update.

Figure 1:
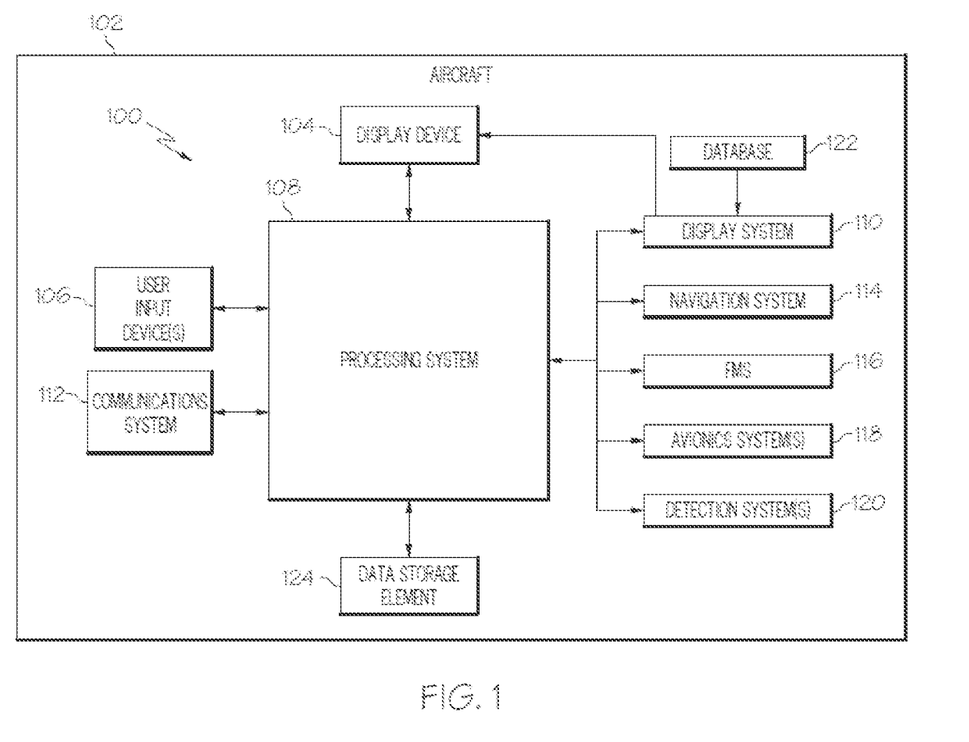
FIG. 1 is a block diagram of a system for an aircraft in an exemplary embodiment.

FIG. 1 depicts an exemplary embodiment of a system 100 which may be located onboard a vehicle, such as an aircraft 102. The system 100 includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below. In various embodiments, the display device 104 may be realized as a multifunction control display unit (MCDU), cockpit display device (CDU), primary flight display (PFD), navigation display, or any other suitable multifunction monitor or display suitable for displaying various symbols and information described herein. The display device 104 may be configured to support multi-colored or monochrome imagery, and could include or otherwise be realized using a liquid crystal display (LCD), a light emitting diode (LED) display, an organic light emitting diode (OLED) display, a heads-up display (HUD), a heads-down display (HDD), a plasma display, a projection display, a cathode ray tube (CRT) display, or the like.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

In exemplary embodiments, the user input device 106 is realized as a tactile user input device capable of receiving free-form user input via a finger, stylus, pen, or the like. Tactile user input may be received or detected using an array of sensors that are configured to detect contact or proximity to a surface using any number of different technologies (e.g., resistive, capacitive, magnetic, acoustic, optical, infrared and/or the like) which are not germane to this disclosure. In exemplary embodiments, the tactile user input device 106 is integrated with an instance of a display device 104 to provide a touchscreen, that is, an array of sensors arranged adjacent or proximate to an electronic display that are configured to detect contact to the surface of the display and generate corresponding output signals indicative of coordinate locations on the display that were touched or otherwise contacted by a user.

As described in greater detail below in the context of FIGS. 2-5, in response to receiving, detecting, or otherwise identifying an output from the tactile user interface device 106 indicative of a tactile user input with respect to a display 104, the processing system 108 may initiate or otherwise perform the graphic annotation process of FIG. 2 to map or otherwise resolve the tactile user input to a corresponding geographic location depicted on the display and assign the tactile user input to a set of geographic location coordinates for propagating the tactile user input to other displays or onboard systems for further processing and/or analysis. That said, it should be appreciated that the subject matter is not limited to tactile user input and a free-form graphical user input may be received with respect to a display device 104 via other types of user input devices 106 (e.g., a mouse).

Still referring to FIG. 1, the processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102, as described in greater detail below.

As described in greater detail below, in one or more exemplary embodiments, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in one or more exemplary embodiments, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in one or more exemplary embodiments, the navigation system 114 includes inertial reference sensors capable of obtaining or otherwise determining the attitude or orientation (e.g., the pitch, roll, and yaw, heading) of the aircraft 102 relative to earth.

In one or more exemplary embodiments, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historical meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
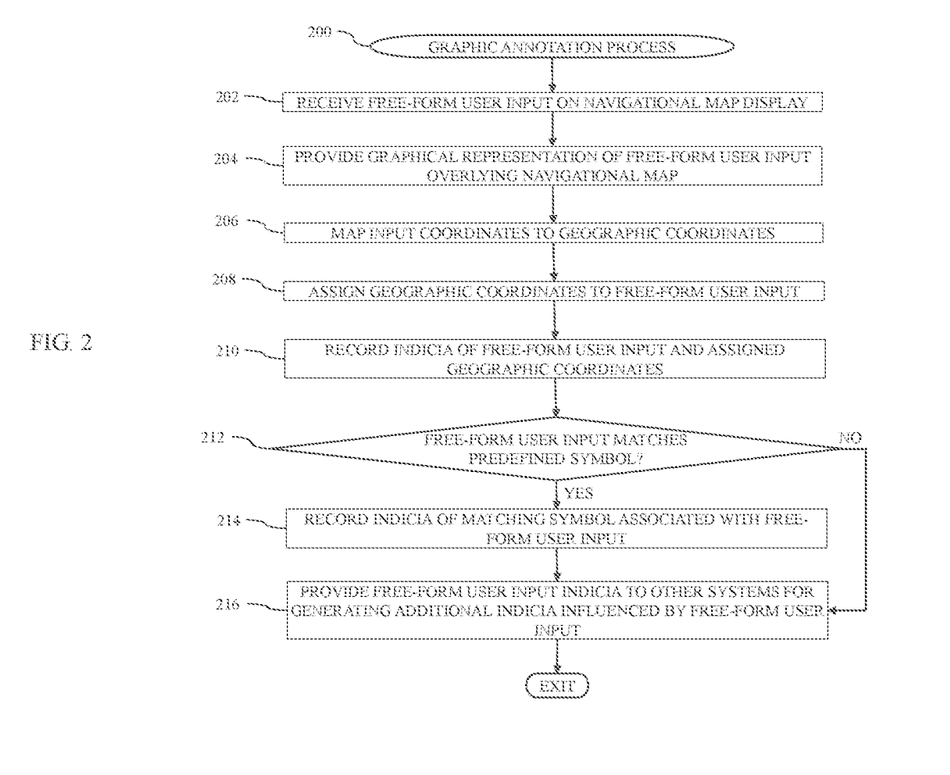
FIG. 2 is a flow diagram of a graphical annotation process suitable for implementation by the aircraft system of FIG. 1 in one or more exemplary embodiments.

FIG. 2 depicts an exemplary embodiment of a graphic annotation process 200 suitable for implementation by an aircraft system or display system to resolve or otherwise map a free-form tactile user input to a particular geographic location for propagating the user input to other displays or onboard systems. The various tasks performed in connection with the illustrated process may be implemented using hardware, firmware, software executed by processing circuitry, or any combination thereof. In practice, portions of the graphic annotation process 200 may be performed by different elements of the aircraft system 100, such as, for example, the display device 104, the user input device 106, the processing system 108, the display system 110, the FMS 116 and/or one or more avionics systems 112, 114, 118, 120.

It should be appreciated that the graphic annotation process 200 may include any number of additional or alternative tasks, the tasks need not be performed in the illustrated order and/or the tasks may be performed concurrently, and/or the tactile input resolution process may be incorporated into a more comprehensive procedure or process having additional functionality not described in detail herein. Moreover, one or more of the tasks shown and described in the context of FIG. 2 could be omitted from a practical embodiment of the tactile input resolution process as long as the intended overall functionality remains intact.

The graphic annotation process 200 initializes by receiving or otherwise obtaining a free-form user input on a navigational map display (task 202). In exemplary embodiments, the processing system 108 continually monitors or otherwise analyzes the output of a touch panel, touchscreen, or other tactile user input device to detect or otherwise identify the presence of a tactile user input on a navigational map display. In this regard, when the pilot or other user makes an input on the tactile user input device 106, the tactile user input device 106 outputs signals indicative of coordinate locations that were touched or otherwise contacted by a user. In response to receiving signals indicative of a free-form user input, the graphic annotation process 200 generates or otherwise provides a graphical representation of the free-form user input on the navigational map display at the corresponding location(s) where the free-form user input was received to thereby provide a corresponding graphical annotation on the navigational map display (task 204). Thus, as the pilot or user provides input via the tactile user input device 106, a corresponding graphical representation of the free-form tactile user input having a size, shape, and other spatial characteristics corresponding to the received user input is displayed on the navigational map display at the coordinate locations on the display device 104 corresponding to where the user input was received on the tactile user input device 106. In this regard, when the tactile user input device 106 and display device 104 are integrated to provide a touchscreen, the graphical representation of the tactile user input underlies the finger, stylus, or other object being utilized to provide the input and tracks the movement of that object to mark or otherwise annotate the navigational map display in accordance with the tactile user input.

After receiving a free-form user input, the graphic annotation process 200 continues by mapping or otherwise converting the coordinate location(s) associated with the free-form user input to corresponding geographic coordinate location(s) depicted on the navigational map display and assigning the corresponding geographic coordinates to the free-form user input (tasks 206, 208). For example, a navigational map may display or otherwise depict a background that includes a graphical representation of the terrain, topology, navigational reference points, airspace designations and/or restrictions, or other suitable items or points of interest corresponding to a currently displayed area of the navigational map, which may be maintained in a terrain database, a navigational database, a geopolitical database, or another suitable database. The currently displayed area of the navigational map corresponds to the geographic area that is currently displayed in the navigational map, that is, the field of view about the center location of the navigational map. In this regard, the center location of the navigational map may function as a reference location for the middle or geometric center of the navigational map which corresponds to a geographic coordinate location (e.g., a particular latitude and longitude coordinate combination) of the terrain or other content depicted at the center of the geographic area depicted within the navigational map.

Based on the geographic location coordinates associated with the geometric center (or other reference location) of the navigational map and the scale of the navigational map, and any underlying equations for coordinate conversions, onscreen coordinate locations on the display device 104 (e.g., pixel coordinates) may be mapped or otherwise converted to corresponding geographic coordinate locations based on the spatial relationship between the pixel location on the display device 104 and the scale of the navigational map (e.g., the ratio between on-screen distance and real-world geographic distance depicted on the map). Accordingly, based on the spatial relationship between the on-screen coordinate locations associated with the free-form user input (or the graphical representation thereof) with respect to on-screen coordinate location(s) associated with the reference geographic coordinate location(s) associated with the currently displayed area of the navigational map, the on-screen coordinate locations associated with the free-form user input may be converted to corresponding geographic coordinate location(s) (e.g., latitude and longitude coordinate combinations) using the scale of the navigational map.

The graphic annotation process 200 stores or otherwise records the mapped geographic coordinate location(s) associated with the on-screen coordinate location(s) where the portion(s) of the free-form tactile user input were received in association with an identifier or other indicia assigned to the free-form tactile user input (task 210). For example, after mapping a tactile user input received via the tactile user input device 106 to a set of geographic coordinate locations, the processing system 108 may create an entry for the free-form user input in a data storage element 124 that maintains the set of geographic coordinate locations in association with an identifier assigned to the entry for the free-form user input. The entry for the free-form user input may also include additional fields for storing or otherwise maintaining additional metadata or descriptive information associated with the free-form user input, such as, for example, an identification of the display on or for which the user input was initially received, an identification of the pilot or crew member who made the user input, a timestamp associated with the user input, and the like. In some embodiments, the processing system 108 may generate and store multiple different free-form user input data entries in the data storage element 124 containing the set of geographic coordinate locations associated with a respective free-form user input, the identifier assigned to the respective free-form user input, and other metadata associated with the respective free-form user input. In such embodiments, the processing system 108 may be configurable to allow users to retrieve, modify, delete and/or archive prior free-form user inputs.

In one or more embodiments, the graphic annotation process 200 analyzes the characteristics of the free-form user input to recognize, resolve or otherwise detect when the free-form user input matches or otherwise corresponds to a predefined symbol (task 212). In this regard, different symbols may be predefined and associated with a particular attribute, state, action, or the like that a user can invoke or assign using the symbol. For example, an 'X' symbol may be defined as indicating an unavailable state associated with displayed content that the 'X' symbol overlies or encompasses to exclude traversal or involvement with operation of the aircraft, while a circle symbol may be defined as indicating the underlying or encompassed content should be traversed, included, or otherwise incorporated into future operation of the aircraft. In this regard, any number of different symbols may be predefined for enabling any number of different attributes, states or actions for invocation by a user. For example, a question mark symbol may be utilized to indicate a need to further clarify the status of an area or provide a graphical or visual reminder for the pilot to request additional information at a later time. The processing system 108 may include or otherwise implement a recognition engine that compares the shape, geometry or other spatial characteristics of the free-form user input to the corresponding predefined spatial characteristics for the different potential symbols supported by the graphic annotation process 200 to detect or otherwise identify when the spatial characteristics of the free-form input are substantially similar to (or within a threshold of) the predefined spatial characteristics for a particular symbol. In some embodiments, the processing system 108 may automatically substitute the predefined symbol for the graphical representation of the free-form user input on the display device 104, for example, to account for situations where turbulence, workload, or other factors may prevent a pilot from making a free-form graphical user input with a desired level of precision. For example, when the free-form user input generally corresponds to a circular symbol, the processing system 108 may automatically display a graphical representation of a computer-generated version of the predefined circular symbol in lieu of the free-form user input to improve clarity or legibility and/or convey that the free-form user input was recognized.

When the free-form user input corresponds to a predefined symbol supported by the graphic annotation process 200, the graphic annotation process 200 stores or otherwise records indicia of the identified symbol associated with the free-form tactile user input in association with the identifier or other indicia assigned to the free-form tactile user input (task 214). For example, the processing system 108 may update a field of the entry for the free-form user input in a data storage element 124 to identify the matched symbol and/or the corresponding attribute, state, or action to be associated with the free-form user input. Additionally, in some embodiments, the processing system 108 may utilize the on-screen coordinates or other spatial characteristics associated with the free-form user input to identify the displayed content implicated by the free-form user input and update the entry to indicate or otherwise maintain association with the implicated displayed content. For example, the processing system 108 may identify a runway, taxiway, navigational reference point, airspace, or other displayed item or points of interest that the free-form user input overlaps, encompasses, or otherwise indicates based on the relationship between the on-screen coordinates of the free-form user input and the on-screen coordinates of the displayed content. In this regard, a free-form user input may implicate a portion of displayed content by overlapping, encompassing, terminating on, initiating from, or otherwise being collocated with the displayed content on the navigational map. The processing system 108 identifies the displayed object or other discrete portion of displayed content that is encompassed or overlapped by the free-form user input or otherwise collocated with (or within a threshold distance of) at least a portion of the free-form user input. In such embodiments, the processing system 108 may correspondingly update the stored entry for the free-form user input in a data storage element 124 to include a value for a field that identifies the runway, taxiway, navigational reference point, or item of interest to be associated with the free-form user input along with the symbol and/or the corresponding attribute, state, or action to be associated with that identified displayed content.

Still referring to FIG. 2, the graphic annotation process 200 transmits or otherwise provides the indicia of the received free-form user input to one or more other onboard systems for generating indicia of the free-form user input on other displays (task 216). For example, the processing system 108 may transmit or otherwise provide the information maintained in the entry associated with the free-form user input to a display system 110, the FMS 116, or another onboard avionics system 118 via an avionics bus, with the destination system 110, 116, 118 generating or otherwise facilitating additional graphical indicia that are influenced by the free-form user input.

For example, when the free-form user input is received via a lateral map display or other two-dimensional navigational map display, the processing system 108 may transmit or otherwise provide indicia of the free-form user input to an onboard display system 110 for providing a corresponding indicia on a primary flight display, a heads-up display, a synthetic vision display, an enhanced vision display, or another suitable forward-looking or perspective view display depicted on another region of the display device 104 or on another instance of a display device 104. In this regard, the destination display system 110 may utilize the geographic coordinate locations assigned to the free-form user input to display a counterpart graphical representation of the free-form user input on the respective display associated with the destination display system 110 that is different from the display where the free-form user input was received. For example, based on the reference geographic location coordinates and scale associated with the destination display, the geographic coordinate locations assigned to the free-form user input may be mapped to on-screen coordinate locations on the destination display where a graphical representation of the free-form user input may be duplicated on the destination display. In this manner, a free-form user input at a particular geographic location on a two-dimensional navigational map display may be automatically mapped to a corresponding geographic location on a three-dimensional navigational map display, a perspective view display, a forward-looking display, and/or the like.

In some embodiments, the spatial coordinates associated with the received free-form user input may be utilized to replicate the graphical representation of the free-form user input on the destination display. In other embodiments, when the free-form user input has been recognized as a predefined symbol, a graphical representation of the predefined symbol may be rendered at the corresponding geographic location on the destination display rather than replicating the free-form user input. In this regard, a computer-generated graphical representation of the symbol may account for the differing viewpoint or perspective of the destination display, for example, by translating from a two-dimensional representation to three-dimensional representation, or vice versa. Moreover, in embodiments where the free-form user input is associated with a particular displayed object on the original display where the free-form user input was received, the counterpart graphical representation of the free-form user input that is automatically generated on the destination display may be rendered at an on-screen location that corresponds to a geographic location associated with that associated object.

In various embodiments, the information associated with the free-form user input is utilized by the FMS 116 or another onboard avionics system 118 to dynamically update an aspect of operating the aircraft 102 and provide a corresponding graphical indicia on a display device 104. In this regard, when the free-form user input is associated with a particular attribute, state, or action for an associated object, the FMS 116 or another onboard avionics system 118 may analyze the information associated with the free-form user input to effectuate that particular attribute, state, or action with respect to the associated object. Thereafter, the output of the FMS 116 or other avionics system 118 may be utilized by the processing system 108 and/or display system 110 to dynamically update a display on a display device 104 to reflect that particular attribute, state, or action with respect to the associated object.

For example, when the on-screen location of the free-form user input corresponds to a navigational reference point displayed on a navigational map display and the spatial characteristics of the free-form user input corresponds to a symbol for including or traversing the navigational reference point, the FMS 116 may dynamically update a flight plan for the aircraft 102 to include that navigational reference point, and a graphical representation of the flight plan for the aircraft 102 depicted on a display device 104 may be dynamically updated to reflect the updated flight plan in lieu of the previous flight plan. As another example, when the on-screen location of the free-form user input corresponds to an airspace displayed on a navigational map display and the spatial characteristics of the free-form user input corresponds to a symbol for excluding or avoiding the airspace, the FMS 116 may dynamically update a flight plan for the aircraft 102 to avoid that airspace, with the graphical representation of the flight plan being correspondingly updated to reflect the updated flight plan. As yet another example, when the on-screen location of the free-form user input corresponds to a taxiway displayed on a navigational map display and the spatial characteristics of the free-form user input corresponds to a symbol for designating the taxiway as closed, the FMS 116 may dynamically update a taxi route for the aircraft 102 to account for the closed taxiway, and a graphical representation of the taxi route for the aircraft 102 depicted on a display device 104 may be dynamically updated to reflect the updated taxi route that reflects the closed taxiway. For example, if the FMS 116 utilizes an algorithm to automatically determine a taxi route for the aircraft 102 (e.g., in the absence of a taxi clearance or instructions from air traffic control (ATC)), the free-form user input designating the taxiway as closed may influence the algorithm to alter the resulting taxi route identified for the aircraft 102. It should be appreciated there are numerous different manners in which the FMS 116 or another avionics system 118 may dynamically perform updates with respect to aircraft operation responsive to user input, and the subject matter is not limited to any particular manner of updating to account for the received free-form user input. Moreover, it should be appreciated that the dynamic updating performed by the FMS 116 or another avionics system 118 may result in corresponding dynamically updated graphical indicia at the original display where the free-form user input was received or a different display, and the subject matter is not limited to any particular type or designation for the display where the updated graphical indicia influenced by the free-form user input are provided.

Figure 3:
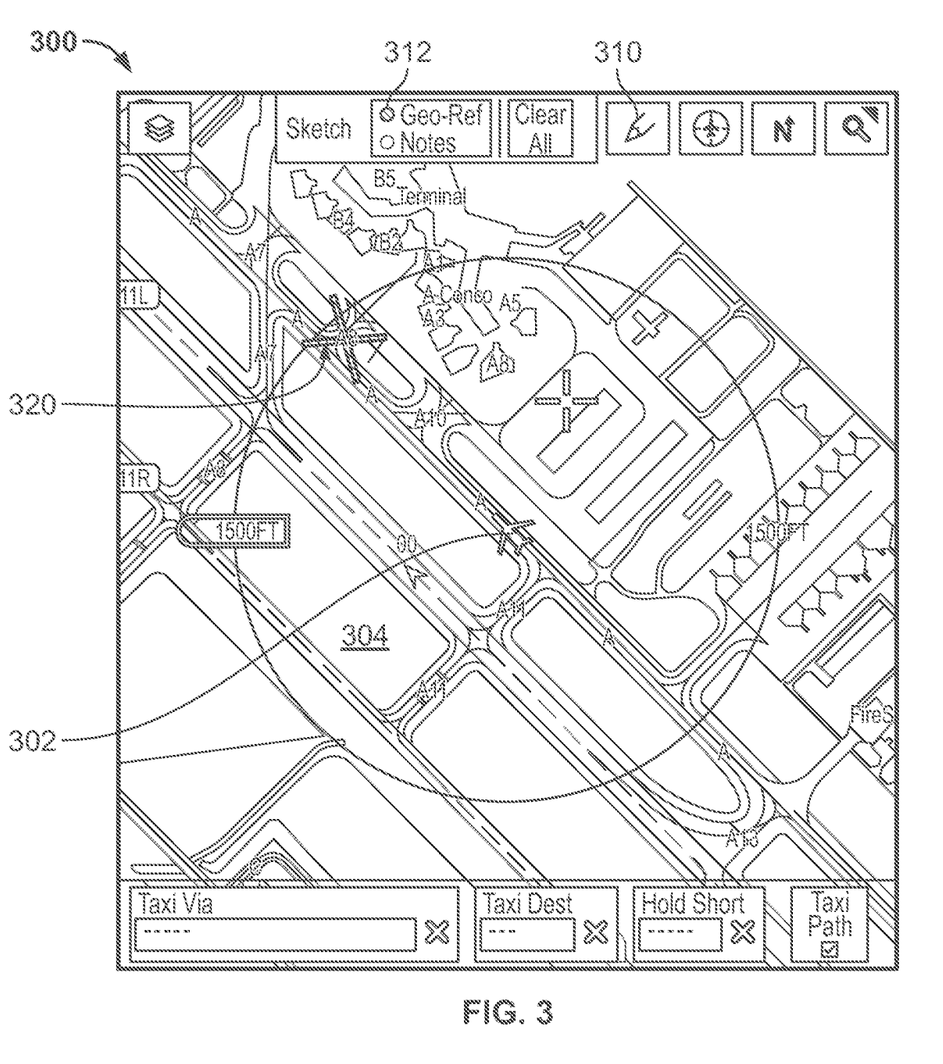
FIGS. 3-4 depict exemplary navigational map graphical user interface (GUI) displays suitable for presentation on a display device onboard the aircraft in the system of FIG. 1 in connection with the graphical annotation process of FIG. 2 in accordance with one or more embodiments.
Figure 4:
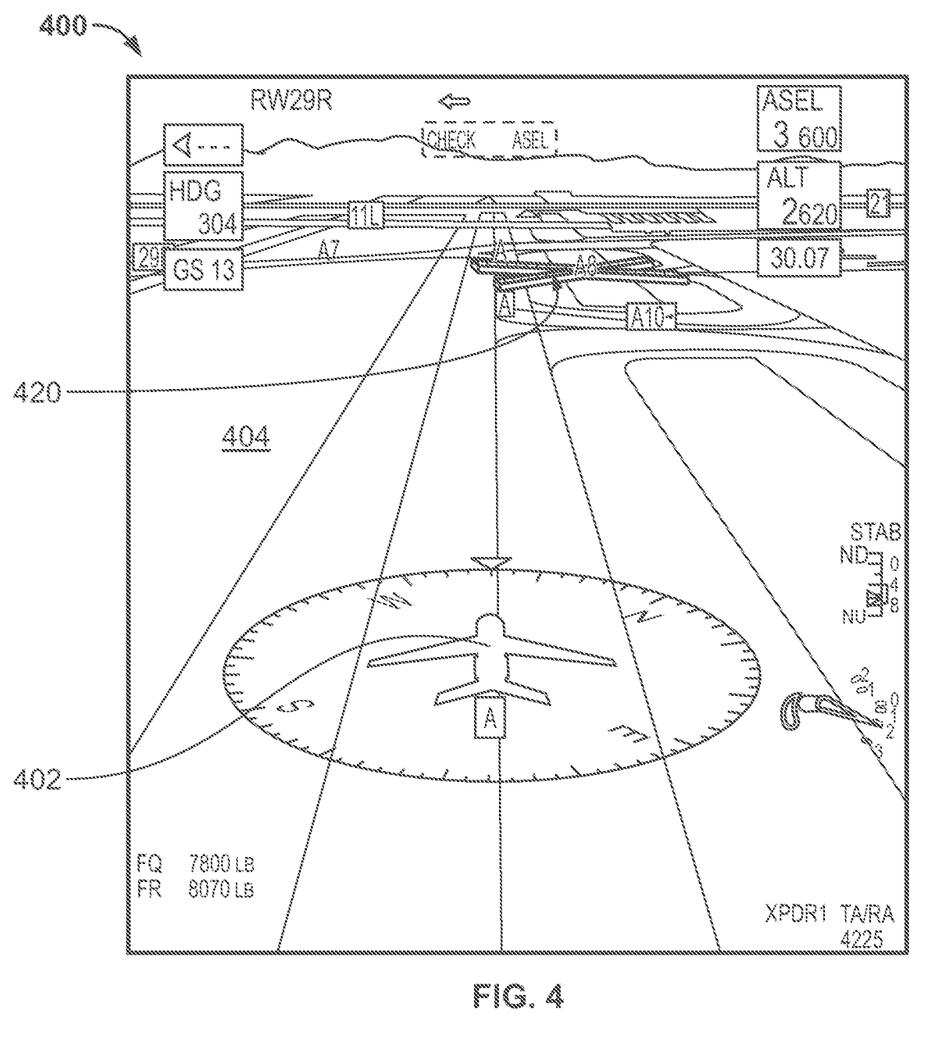

FIG. 3-4 depict an exemplary navigational map graphical user interface (GUI) displays that may be displayed, rendered, or otherwise presented by a display system 110 and/or a processing system 108 on a display device 104 onboard an aircraft 102 in connection with the graphic annotation process 200 of FIG. 2. In this regard, FIG. 3 depicts a two-dimensional lateral navigational map GUI display 300 (e.g., a lateral map display), while FIG. 4 depicts a three-dimensional forward-looking perspective view navigational map GUI display 400 (e.g., a synthetic vision display, a primary flight display, or the like).

Referring to FIG. 3, the lateral navigational map GUI display 300 (alternatively referred to herein without limitation as the lateral map) depicts a top-down view (e.g., from above the aircraft) and includes a graphical representation 302 of the aircraft overlaid or rendered on top of a background 304. The background 304 of the lateral map 300 generally includes a graphical representation of the terrain, topology, navigational reference points, airspace designations and/or restrictions, or other suitable items or points of interest corresponding to the currently displayed area of the lateral map 300, which may be maintained in a terrain database, a navigational database, a geopolitical database, or another suitable database (e.g., database 122). In this regard, FIG. 3 depicts a scenario where the aircraft is located on the ground at an airport, where the display system 110 and/or processing system 108 renders a graphical representation of the runways, taxiways, terminal areas, gates, and/or other objects associated with the airport that are located within the currently displayed geographic area of the lateral map 300. In one or more embodiments, the center location of the lateral map 300 comprises a reference location for the middle or geometric center of the lateral map 300 which corresponds to a geographic location. In some embodiments, the geographic location for the geometric center of the lateral map 300 corresponds to the current geographic location of the aircraft to maintain the displayed area of the lateral map 300 centered on the aircraft symbology 302. The displayed area of the lateral map 300 corresponds to the geographic area that is currently displayed in the lateral map 300, that is, the field of view about the center location of the lateral map 300.

In one or more exemplary embodiments, the lateral map 300 is associated with the movement of the aircraft, and the aircraft symbology 302 and/or background 304 refreshes or otherwise updates as the aircraft travels, such that the graphical representation of the aircraft 302 is positioned over the terrain background 304 in a manner that accurately reflects the current (e.g., instantaneous or substantially real-time) real-world positioning of the aircraft relative to the earth. In embodiments where the lateral map 300 is centered on the aircraft, the aircraft symbology 302 is located at a fixed position at the geometric center of the lateral map 300 (e.g., by updating the background 304 with respect to the aircraft symbology 302 such that the map 300 is maintained centered on and/or aligned with the aircraft symbology 302). That said, in other embodiments, the aircraft symbology 302 may be shown as traveling across the lateral map 300 (e.g., by updating the location of the aircraft symbology 302 with respect to the background 304), with the geometric center and/or displayed area of the lateral map 300 being decoupled from or otherwise independent of the aircraft location. Additionally, depending on the embodiment, the lateral map 300 may be oriented in a cardinal direction (e.g., oriented north-up so that moving upward on the map 300 corresponds to traveling northward), or alternatively, the orientation of the lateral map 300 may be track-up or heading-up (i.e., aligned such that the aircraft symbology 302 is always traveling in an upward direction and the background 304 adjusted accordingly).

Referring to FIG. 4, the three-dimensional forward-looking perspective view primary taxi GUI display 400 corresponds a PFD transitioned into a taxi mode when on ground to provide a forward-looking view from the current geographic location of the aircraft depicted in the lateral map 300 of FIG. 3. The three-dimensional perspective view map display 400 includes a reference symbol 402 corresponding to the current location and orientation of the aircraft with respect to a synthetic perspective view of the current airport environment and any surrounding terrain 404. For purposes of explanation, but without limitation, the three-dimensional forward-looking perspective view display 400 may alternatively be referred to herein as a synthetic vision display in an exocentric view display mode. In this regard, the background terrain or airport environment 404 is based on a set of terrain data that corresponds to a viewing region proximate the current location of aircraft 102 that corresponds to the forward-looking perspective view and includes three-dimensional perspective graphical representation of the runways, taxiways, terminal areas, gates, and/or other objects associated with the airport that are located within the currently displayed geographic area of the synthetic vision map 400. Similar to the lateral map display 300, a display system 110 and/or the processing system 108 may utilize a terrain database 122 in conjunction with the current geographic location and heading of the aircraft (e.g., from navigation system 114) to control the rendering of the terrain 404 on the display device 104 and update terrain 404 as needed as the aircraft 102 travels. In exemplary embodiments, the synthetic vision map 400 corresponds to a viewpoint along a line of sight aligned with a longitudinal axis of the aircraft, and the features of terrain 404 are displayed in a conformal manner, relative to the Earth. For example, the relative elevations and altitudes of features in terrain 404 are displayed in a virtual manner that emulates reality, and the synthetic map display 400 provides a continuously updated virtual representation for the flight crew that reflects the current state of the aircraft 102 with respect to the Earth.

Referring again to FIG. 3 with reference to FIGS. 1-2, in the illustrated embodiment, the lateral map 300 includes a button or similar selectable GUI element 310 that may be selected by a pilot or other user to enable free-form graphical user inputs on the lateral map 300. The lateral map 300 also includes a radio button or similar selectable GUI element 312 that initiates or otherwise configures the graphic annotation process 200 to assign or otherwise associate a free-form graphical user input received on the lateral map 300 with a corresponding geographic location that is depicted on the lateral map 300 underlying the on-screen locations where the free-form graphical user input is received. As depicted in FIG. 3, the pilot or other crew member utilizes a tactile user input device or other user input device to draw a free-form graphical user input 320 resembling the letter 'X' on the lateral map 300 overlying taxiway A8, for example, in response to receiving a radio communication from ATC indicating taxiway A8 is closed or otherwise unavailable. For example, in embodiments where the lateral map 300 is depicted on a display device 104 integrated with a tactile user input device 106 to provide a touchscreen, the pilot may use a finger, stylus, or other object to draw a free-form X symbol on the display device 104 by touching or otherwise contacting the surface of the display device 104 at on-screen locations collocated with the A8 taxiway.

As described above, in response to receiving the free-form user input on the lateral map 300 (e.g., task 202), the processing system 108 and/or the display system 110 generates a graphical representation of the free-form user input 320 on the lateral map 300 at a location on the lateral map 300 corresponding to the location where the user input was received via the user input device 106 (e.g., task 204). Thereafter, using the geographic location associated with the center of the lateral map 300 and the scale of the lateral map 300, the processing system 108 and/or the display system 110 may map or otherwise convert the on-screen location where the free-form user input 320 is depicted to the collocated geographic location underlying the user input 320 (e.g., task 206), for example, by mapping pixel coordinate locations (e.g., row and column combinations) to corresponding geographic coordinate locations (e.g., latitude and longitude coordinate combinations) depicted at those pixel coordinate locations. The processing system 108 and/or the display system 110 assigns the mapped geographic coordinate locations to the free-form user input 320 and creates an entry for maintaining the association between the free-form user input 320 and the assigned geographic locations (e.g., tasks 208, 210). In some embodiments, the graphic annotation process 200 also associates the taxiway A8 with the free-form user input 320 based on the free-form user input 320 overlying the taxiway A8 on the lateral map 300. In this regard, in some embodiments, the graphic annotation process 200 may average or otherwise combine the geographic location coordinates to identify a representative geographic location corresponding to the geometric center of the user input 320 for establishing an association between the free-form user input 320 and a depicted object or feature on the lateral map 300 when the distance between the free-form user input 320 and the displayed feature is less than a threshold distance. In this regard, the graphic annotation process 200 may associate the taxiway A8 with the free-form user input 320 based on the distance between the representative geographic location associated with the free-form user input 320 and a geographic location associated with taxiway A8 being less than a threshold. In response, the processing system 108 and/or the display system 110 set the value for an object association field of the entry associated with the free-form user input 320 in the data storage element 124 to indicate taxiway A8 as the displayed object or feature associated with the user input 320.

As described above, in some embodiments, the graphic annotation process 200 may also analyze the size, shape or other characteristics of the free-form user input 320 to determine whether the free-form user input 320 matches or otherwise corresponds to a predefined symbol associated with a particular attribute, state, or action (e.g., task 212). For example, as described above, the 'X' symbol may be defined as being associated with a closed or unavailable state or attribute. Thus, when the graphic annotation process 200 recognizes the free-form user input 320 as matching or otherwise corresponding to an 'X' symbol, the processing system 108 and/or the display system 110 set the value for a field of the entry associated with the free-form user input 320 in the data storage element 124 to indicate a closed or unavailable state associated with the free-form user input 320 (e.g., task 214). In this regard, based on the entry for the free-form user input 320 being associated with both the taxiway A8 and a closed or unavailable state, the entry for the free-form user input 320 may be utilized to convey a closed or unavailable state for taxiway A8 to the FMS 116 or another onboard system 118 (e.g., task 216), for example, by broadcasting or otherwise transmitting the information associated with the free-form user input 320 to other avionics systems 112, 114, 116, 118 via an avionics bus. Thus, in embodiments where the lateral map 300 depicts a taxi route for the aircraft, in response to the free-form user input 320 and the graphic annotation process 200, the FMS 116 or another system 118 may dynamically determine an updated taxi route for the aircraft, which, in turn, is provided to the processing system 108 and/or the display system 110 for dynamically updating the lateral map 300 to include a graphical representation of the updated taxi route responsive to the free-form user input 320 indicating taxiway A8 is closed.

Referring to FIG. 4 with reference to FIGS. 1-3, in the illustrated embodiment, in response to receiving and analyzing the free-form user input 320, the graphic annotation process 200 transmits or otherwise provides the information associated with the free-form user input 320 to a synthetic vision display system 110 or another process associated with the display and/or rendering of the synthetic vision map 400 to automatically dynamically update the synthetic vision map 400 to include an autogenerated graphical representation of the free-form user input 420 on the synthetic vision map 400 at the geographic location on the synthetic vision map 400 that corresponds to the same geographic location on the lateral map 300 where the free-form user input 320 was received. In this manner, the free-form user input 320 received via the lateral map 300 may be automatically translated and propagated to the synthetic vision map 400 without requiring the pilot or other user to manually interact or interface with the synthetic vision map 400. As described above, depending on the embodiment, the duplicated graphical representation 420 of the original free-form user input 320 may replicate the original free-form user input 320 using the stored geographic coordinate locations or other spatial information associated with the original free-form user input 320, or alternatively, an autogenerated 'X' symbol may be rendered on the synthetic vision map 400 at a representative geographic location corresponding to the geographic location on the lateral map 300 where the original free-form user input 320 was received rather than replicating the original free-form user input 320.

Still referring to FIGS. 3-4 with continued reference to FIGS. 1-2, it should be noted that the graphic annotation process 200 may be implemented in an equivalent manner to translate, map, or otherwise propagate a free-form graphical user input received on the synthetic vision map 400 to the lateral map 300. For example, although not depicted in FIG. 4, the synthetic vision map 400 may include one or more selectable GUI elements (e.g., GUI elements 310, 312) that may be selected by a pilot or other user to enable free-form georeferenced graphical user inputs to be made on the synthetic vision map 400. Thereafter, the pilot or other crew member may draw a free-form graphical user input 420 resembling the letter 'X' on the synthetic vision map 400 overlying taxiway A8. In a similar manner as described above, the graphic annotation process 200 may map or otherwise convert the on-screen coordinate locations of the free-form user input 420 to corresponding geographic coordinate locations based on the geographic location and displayed geographic area associated with the synthetic vision map 400. The geographic location assigned to the free-form user input 420 may then be utilized to automatically populate, duplicate or otherwise replicate a graphical representation of the free-form user input 320 on the lateral map 300 and/or associate the user input 420 with the taxiway A8 for conveying the state of taxiway A8 to other avionics systems 112, 114, 116, 118.

It should be noted that although the subject matter is described herein primarily in the context of a navigational map displays, the subject matter described herein is not necessarily limited to navigational map displays and may be implemented in an equivalent manner for a vertical profile display (or vertical situation display), a primary flight display, a head-up display (HUD), a near-to-eye (NTE) display, a head-worn display (HWD), or any other suitable GUI display where a georeferenced free-form graphical user input having an associated geographic location may be populated or propagated to.

Figure 5:
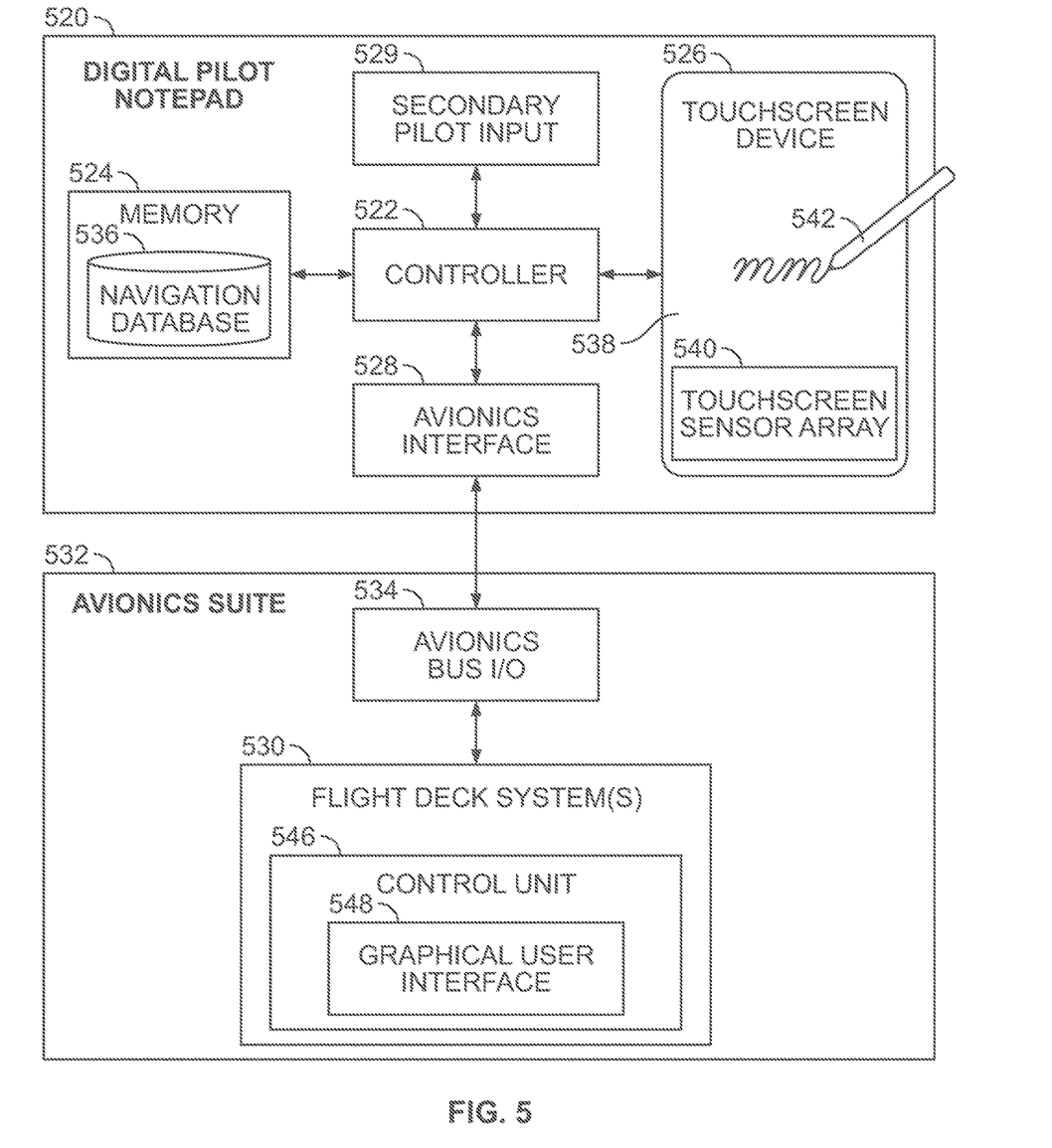
FIG. 5 is a block diagram of a graphic annotation system suitable for implementing the graphical annotation process of FIG. 2 in accordance with one or more embodiments.

FIG. 5 is a block diagram of a graphic annotation system 520 suitable for implementing the graphic annotation process 200. The graphic annotation system 520 includes a controller 522, a memory 524, and a touchscreen device 526. Graphic annotation system 520 also includes an avionics interface 528, which enables the graphic annotation system 520 to transmit data to and possibly receive data from at least one flight deck system 530 included within the avionics suite 532 of an aircraft. Specifically, during operation of the graphic annotation system 520, controller 522 can submit alphanumeric data to one or more flight deck systems 530 by placing the alphanumeric data on an avionics data bus via an input/output (I/O) 534. The datalink between avionics interface 528 and avionics bus I/O 534 can be physical or wireless, depending upon the particular manner in which the graphic annotation system 520 is implemented. In this regard, graphic annotation system 520 may be mounted within the aircraft cockpit in a non-pilot-removable manner or, instead, may be a portable electronic device that can be freely carried into and out of the cockpit by the pilot. The various manners in which graphic annotation system 520 can be implemented are discussed more fully below; first, however, each of the components included within the graphic annotation system 520 is described in greater detail.

The controller 522 generally represents a processing system or hardware (e.g., processing system 108) associated with the graphic annotation system 520, and the controller 522 can include any suitable number of individual microprocessors, microcontrollers, digital signal processors, programmed arrays, and other standard components known in the art. Controller 522 may include or cooperate with any number of software or firmware programs designed to carry out the various methods, process tasks, calculations, and control/display functions described herein. Controller 522 will typically execute an operating system stored in memory 524 when graphic annotation system 520 is operational to assist the various programs executing on the graphic annotation system 520 to access the hardware features thereof.

The memory 524 generally represents a data storage element (e.g., data storage element 124) of the graphic annotation system 520 can include any number of volatile and/or non-volatile memory elements. In many embodiments, memory 524 will include a central processing unit register, a number of temporary storage areas, and a number of permanent storage areas. Memory 524 can also include one or more mass storage devices, such as magnetic hard disk drives, optical hard disk drives, flash memory drives, and the like. As schematically indicated in FIG. 5, memory 524 can store a navigation database 536 containing waypoint information, such as waypoint identifiers; airport map information; runway information; and the like. Graphic annotation system 520 may periodically update the database 536 through avionics suite 532 by, for example, copying a navigational database included within a Flight Management System (FMS) of avionics suite 532 to internal memory 524 of the graphic annotation system 520. In other embodiments, the database 536 can be periodically updated by connecting graphic annotation system 520 to a digital network, such as an open Content Delivery Network (CDN), the Internet, or any other digital network based upon Transmission Control Protocol (TCP)/Internet Protocol (IP) or other conventional protocols. In certain implementations, a pilot may subscribe to a global datacenter that, in turn, supports the functionality of graphic annotation system 520 and provides periodic updates to the database 536.

The touchscreen device 526 can be any device having a display 538 (e.g., display device 104) and a sensor array 540 capable of detecting handwritten input (e.g., user input device 106) "drawn" across the display screen in a free-form manner. In this regard, the sensor array 540 may be integrated into, disposed beneath, or otherwise suitably positioned within respect to display screen 538 to detect user input directed to the display screen 538. Display screen 538 can be any image-generating device, such as a liquid crystal display. Sensor array 40 can comprise any number and type of sensors configured to register or detect input of handwritten characters, symbols, and the like "drawn" onto display screen 538. In some embodiments, a pilot may utilize a stylus 542 when providing input to touchscreen device 526, interacting with virtual widgets generated on display screen 538, or otherwise interacting with the GUI generated on touchscreen device 526. However, the possibility that a pilot may interact with touchscreen device 526 utilizing a different writing implement or a finger is not precluded.

In many embodiments, graphic annotation system 520 may be equipped with other pilot input devices beyond touchscreen device 526. Such auxiliary pilot inputs are collectively identified as secondary pilot input 529 and can include any combination of cursor control devices (e.g., mice, trackballs, and joysticks), keyboards or keypads, buttons, switches, microphones, cameras, knobs, the like. Secondary pilot input 529 can be utilized to provide pilot input data in concert with the free-form user input received via touchscreen device 526. Secondary pilot input 529 can also provide an alternative means for providing a free-form user input on a display 538 should it become difficult to provide input directly to the touchscreen device 526 due to turbulence or for another reason.

In one or more embodiments, the graphic annotation system 520 may be implemented as a portable electronic device that can be freely carried into and out of the cockpit by a pilot, such as a tablet computer or Electronic Flight Bag (EFB) having touchscreen capabilities. In such embodiments, avionics interface 528 may include or assume the form of a wireless (e.g., radio frequency) transceiver capable of bidirectional communication with bus I/O 534, which may likewise include or assume the form of a compatible wireless transceiver. It may also be possible to physically connect graphic annotation system 520 to bus I/O 534 utilizing a cable, dock, or other physical connection interface when the graphic annotation system 520 assumes the form of a portable electronic device. In other embodiments, graphic annotation system 520 may be standalone device that is mounted within the aircraft cockpit in a manner that, for all practical purposes, prevents pilot removal. In this case, graphic annotation system 520 is preferably positioned at a location allowing the pilot to easily reach display screen 538 while operating the aircraft; e.g., graphic annotation system 520 can be affixed to the yoke of an aircraft or mounted to a movable platform adjacent the pilot's seat. In such embodiments, graphic annotation system 520 will often communicate with flight deck system 530 over a wired connection with avionics interface 528 including a hardwire connection and associated I/O pins, although the possibility that the graphic annotation system 520 can wirelessly communicate with flight deck system 530 in such embodiments is not precluded. As a still further possibility, graphic annotation system 520 can be implemented as an enhanced Multi-Purpose Control Display Unit (MCDU) or other flight deck system control unit adapted to have touchscreen capabilities and perform the functions described herein.

The avionics suite 532 can include any number of flight deck display systems 530 (e.g., display system 110) or avionics systems (e.g., avionics systems 112, 114, 116, 118, 120) capable of receiving data or information from the graphic annotation system 520. Each flight deck system 530 can include a dedicated control unit 546; or, as will often be the case, multiple flight deck systems 530 can share a common control unit 546. In one embodiment, control unit 546 assumes the form of an MCDU utilized to enter navigational commands into an FMS and possibly other flight deck systems included within avionics suite 532. In the illustrated embodiment, a GUI display 548 is selectively generated on the display of control unit 546.

Referring to FIG. 5 with reference to FIG. 2, as described above, the graphic annotation process 200 automatically transmits or otherwise provides georeferenced free-form user input data received via the touchscreen 526 to other flight deck systems 530 via the avionics interface 528 and/or avionics bus I/O 538, to thereby automatically update the output of the respective flight deck system(s) 530 displayed on the GUI display 548 without requiring a pilot to manually interact with the other flight deck systems 530. For example, the pilot can make a free-form user input on the touchscreen 526 to indicate a particular taxiway, runway, airspace, navigational reference point, or the like should be avoided, and in accordance with the graphic annotation process 200, the graphic annotation system 520 automatically pushes, transmits, or otherwise provides indicia of the user-indicated taxiway, runway, airspace, or navigational reference point to be avoided to an FMS or other flight deck system 530. The destination flight deck system 530 that receives the free-form user input data from the graphic annotation system 520 can then incorporate the free-form user input data to automatically update the algorithms or other outputs of the flight deck system 530 to reflect avoidance of the user-indicated taxiway, runway, airspace, or navigational reference point, and then correspondingly update the GUI display 548 to reflect avoidance of that user-indicated taxiway, runway, airspace, navigational reference point without the pilot ever having to manually interact with the flight deck system 530 or the GUI display 548. In this regard, the GUI display 548 may be automatically updated substantially concurrent to the pilot making the free-form user input on the touchscreen 526, thereby allowing a pilot to seamlessly move his or her focus from the original display 538 where the free-form user input was received to another GUI display 548 without losing situational awareness with respect to the geographic location and operational significance of the free-form user input. For example, if the free-form user input is provided on a lateral map displayed on the touchscreen 526, the pilot may concurrently view a replication of the free-form user input on a synthetic vision display, primary flight display, or other GUI display 548 provided by another flight deck system 530 by automatically translating and propagating the georeferenced free-form user input and without requiring the pilot to manually interact with the other flight deck system (s) 530.

For the sake of brevity, conventional techniques related to graphical user interfaces, graphics and image processing, touch sensing, touchscreens, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method comprising:
   receiving a free-form user input having a shape corresponding to a predefined symbol associated with a particular attribute, state, or action on a first navigational map graphical user interface (GUI) associated with an aircraft, the first navigational map GUI comprising one of a lateral map display and a forward-looking display;
   assigning a geographic location to the free-form user input based on a position of the free-form user input on the first navigational map GUI, resulting in a georeferenced free-form user input;
   identifying one of a taxiway, a runway, an airspace and a navigational reference point associated with the georeferenced free-form user input to be avoided based on a distance between the geographic location assigned to the georeferenced free-form user input and a respective geographic location associated with the one of the taxiway, the runway, the airspace and the navigational reference point being less than a threshold distance;
   generating, on a second navigational map GUI associated with the aircraft depicting content different from the first navigational map GUI where the free-form user input was received, a second graphical representation of the georeferenced free-form user input on the second navigational map GUI concurrent to displaying a graphical representation of the free-form user input on the first navigational map GUI, wherein:
   the second graphical representation is displayed at a translated position on the second navigational map GUI corresponding to the geographic location assigned to the georeferenced free-form user input based on the position of the free-form user input on the first navigational map GUI;
   the second graphical representation indicates the particular attribute, state, or action associated with the one of the taxiway, the runway, the airspace and the navigational reference point associated with the georeferenced free-form user input; and
   the second navigational map GUI comprises an other one of the lateral map display and the forward-looking display.

2. The method of claim 1, wherein:
   the first navigational map GUI comprises a two-dimensional display; and
   the second navigational map GUI comprises a three-dimensional display.

3. The method of claim 1, wherein:
   the first navigational map GUI comprises a three-dimensional display; and
   the second navigational map GUI comprises a two-dimensional display.

4. The method of claim 1, wherein:
   receiving the free-form user input comprises receiving a free-form tactile user input on a touchscreen having the first navigational map GUI displayed thereon;
   assigning the geographic location comprises assigning the geographic location displayed on the first navigational map GUI on the touchscreen underlying the free-form tactile user input to the free-form user input; and
   generating the second graphical representation comprises displaying the second graphical representation corresponding to the free-form tactile user input at the translated position on the second navigational map GUI corresponding to the geographic location displayed on the first navigational map GUI on the touchscreen underlying the free-form tactile user input.

5. The method of claim 1, further comprising recognizing the free-form user input as the predefined symbol, wherein generating the second graphical representation comprises displaying a graphical representation of the predefined symbol on the second navigational map GUI at the translated position on the second navigational map GUI corresponding to the geographic location assigned to the free-form user input.

6. The method of claim 1, further comprising:
associating the free-form user input with the one of the taxiway, the runway, the airspace and the navigational reference point based on the geographic location;
recognizing the free-form user input as the predefined symbol; and
determining an updated route of travel by updating a planned route of travel based on the predefined symbol and the association between the free-form user input and the one of the taxiway, the runway, the airspace and the navigational reference point, resulting the updated route of travel.

7. The method of claim 6, wherein updating the planned route of travel comprises determining the updated route of travel that excludes the one of the taxiway, the runway, the airspace and the navigational reference point based on the particular attribute, state, or action associated with the predefined symbol.

8. The method of claim 1, wherein generating the second graphical representation comprises automatically propagating the free-form user input from the first navigational map GUI to the second navigational map GUI.

9. The method of claim 1, wherein the free-form user input is unconstrained and not limited to any particular geometric characteristic.

10. The method of claim 1, further comprising analyzing the shape of the free-form user input to detect when the shape of the free-form user input corresponds to the predefined symbol for avoiding the geographic location.

11. The method of claim 1, further comprising updating an entry for the free-form user input in a data storage element to include a value for a field that identifies the one of the taxiway, the runway, the airspace and the navigational reference point to be avoided or the particular attribute, state, or action.

12. The method of claim 1, further comprising updating an entry for the free-form user input in a data storage element to include a value for a field that identifies the particular attribute, state, or action associated with the geographic location.

13. The method of claim 1, wherein:
the first navigational map GUI comprises a two-dimensional lateral map display; and
the second navigational map GUI comprises a three-dimensional synthetic vision display.

14. The method of claim 1, wherein:
the first navigational map GUI comprises a two-dimensional lateral map display; and
the second navigational map GUI comprises a primary flight display.

15. The method of claim 1, further comprising creating an entry for the free-form user input in a data storage element to maintain an association between a set of geographic coordinate locations mapped to the free-form user input and the particular attribute, state, or action associated with the geographic location.

16. The method of claim 1, further comprising comparing the free-form user input to different potential symbols to identify when the shape of the free-form user input is substantially similar to predefined spatial characteristics for the predefined symbol.

17. The method of claim 16, further comprising automatically substituting a graphical representation of the predefined symbol associated with the particular attribute, state, or action for the graphical representation of the free-form user input on the first navigational map GUI.

18. The method of claim 1, wherein the second graphical representation comprises a counterpart graphical representation of the free-form user input on a three-dimensional navigational map display that is different from a two-dimensional navigational map display where the free-form user input was received.

19. The method of claim 1, wherein receiving the free-form user input comprises receiving the free-form user input after receiving an ad hoc radio communication from air traffic control (ATC) indicating the particular attribute, state, or action for the one of the taxiway, the runway, the airspace and the navigational reference point.

20. A non-transitory computer-readable medium having computer-executable instructions stored thereon that, when executed by a processing system, cause the processing system to:
receive a free-form user input having a shape corresponding to a predefined symbol associated with a particular attribute, state, or action on a first navigational map graphical user interface (GUI) associated with an aircraft, the first navigational map GUI comprising one of a lateral map display and a forward-looking display;
assign a geographic location to the free-form user input based on a position of the free-form user input on the first navigational map GUI, resulting in a georeferenced free-form user input;
identify one of a taxiway, a runway, an airspace and a navigational reference point associated with the georeferenced free-form user input to be avoided based on a distance between the geographic location assigned to the georeferenced free-form user input and a respective geographic location associated with the one of the taxiway, the runway, the airspace and the navigational reference point being less than a threshold distance;
generate, on a second navigational map GUI associated with the aircraft depicting content different from the first navigational map GUI where the free-form user input was received, a second graphical representation of the georeferenced free-form user input on the second navigational map GUI concurrent to displaying a graphical representation of the free-form user input on the first navigational map GUI, wherein:
the second graphical representation is displayed at a translated position on the second navigational map GUI corresponding to the geographic location assigned to the georeferenced free-form user input based on the position of the free-form user input on the first navigational map GUI;
the second graphical representation indicates the particular attribute, state, or action associated with the one of the taxiway, the runway, the airspace and the navigational reference point associated with the georeferenced free-form user input; and
the second navigational map GUI comprises an other one of the lateral map display and the forward-looking display.

* * * * *